(12) United States Patent
Chopra et al.

(10) Patent No.: US 10,308,827 B2
(45) Date of Patent: Jun. 4, 2019

(54) INK JET INK COMPOSITIONS FOR DIGITAL MANUFACTURING OF TRANSPARENT OBJECTS

(71) Applicant: Xerox Corporation, Norwalk, CT (US)

(72) Inventors: Naveen Chopra, Oakville (CA); Barkev Keoshkerian, Thornhill (CA); Carolyn Moorlag, Mississauga (CA); C. Geoffrey Allen, Waterdown (CA); Marcel P. Breton, Mississauga (CA); Gordon Sisler, St. Catharines (CA)

(73) Assignee: Xerox Corporation, Norwalk, CT (US)

( * ) Notice: Subject to any disclaimer, the term of this patent is extended or adjusted under 35 U.S.C. 154(b) by 487 days.

(21) Appl. No.: 14/927,844

(22) Filed: Oct. 30, 2015

(65) Prior Publication Data

US 2017/0121547 A1    May 4, 2017

(51) Int. Cl.
| | |
|---|---|
| *B33Y 10/00* | (2015.01) |
| *C09D 11/38* | (2014.01) |
| *C09D 11/101* | (2014.01) |
| *B29C 64/112* | (2017.01) |
| *C09D 11/34* | (2014.01) |
| *B33Y 70/00* | (2015.01) |

(52) U.S. Cl.
CPC ............ *C09D 11/38* (2013.01); *B29C 64/112* (2017.08); *C09D 11/101* (2013.01); *C09D 11/34* (2013.01); *B33Y 10/00* (2014.12); *B33Y 70/00* (2014.12)

(58) Field of Classification Search
CPC ...... C09D 11/103; C09D 11/38; B29C 64/112
See application file for complete search history.

(56) References Cited

U.S. PATENT DOCUMENTS

| | | | |
|---|---|---|---|
| 7,259,275 B2 | 8/2007 | Belelie et al. | |
| 8,142,557 B2 | 3/2012 | Belelie et al. | |
| 8,545,002 B2 | 10/2013 | Belelie et al. | |
| 8,642,692 B1 | 2/2014 | Stockwell et al. | |
| 8,882,256 B2 | 11/2014 | Chopra et al. | |
| 8,916,084 B2 | 12/2014 | Chretien et al. | |
| 2010/0323102 A1 | 12/2010 | Chopra et al. | |
| 2013/0328980 A1* | 12/2013 | Chopra ................ | C09D 177/08 347/102 |

(Continued)

OTHER PUBLICATIONS

Marcel P. Breton, et al., U.S. Appl. No. 14/630,629, filed Feb. 24, 2015 "3D Printing System Comprising Solid Build Ink Comprising Colorant," not yet published.

(Continued)

*Primary Examiner* — Peter L Vajda
(74) *Attorney, Agent, or Firm* — Marylou J. Lavoie, Esq. LLC

(57) ABSTRACT

A curable ink including at least one monomer, oligomer, or prepolymer; an optional photoinitiator; an optional colorant; and amide gellant having a molecular weight of from about 800 to about 2,500 g/mole; wherein the ink has an onset of gelation defined by the glass transition of the low molecular weight amide gellant according to the relationship Onset of Gelation (K)=(Constant) Tg of gellant (K); wherein the Constant is less than 1.5. A process for printing a three-dimensional article including providing a curable ink; depositing the curable ink in one or more layers; and curing the deposited ink to form the three-dimensional object.

22 Claims, 2 Drawing Sheets

(56) References Cited

U.S. PATENT DOCUMENTS

2013/0344232 A1* 12/2013 Chopra .................. H01G 13/00
                                                            427/79
2014/0171537 A1    6/2014  Vanbesien et al.
2017/0121547 A1    5/2017  Chopra et al.

OTHER PUBLICATIONS

Canadian Office Action issued in Canadian Application No. 2,945,805, dated Dec. 11, 2017, 4 pages.

* cited by examiner

INK JET INK COMPOSITIONS FOR DIGITAL MANUFACTURING OF TRANSPARENT OBJECTS

BACKGROUND

Disclosed herein is an ink jet ink composition for digital manufacturing of transparent objects. Further disclosed is a curable ink comprising at least one monomer, oligomer, or prepolymer; an optional photoinitiator; an optional colorant; and an amide gellant having a molecular weight of from about 800 to about 2,500 g/mole; wherein the ink has an onset of gelation defined by the glass transition of the amide gellant according to the relationship Onset of Gelation (K)=(Constant) Tg of gellant (K); wherein the Constant is less than 1.5.

Still further disclosed is a process for printing a three-dimensional article comprising providing a curable ink comprising at least one monomer, oligomer, or prepolymer; an optional photoinitiator; an optional colorant; and an amide gellant having a molecular weight of from about 800 to about 2,500 g/mole; wherein the ink has an onset of gelation defined by the glass transition of the amide gellant according to the relationship Onset of Gelation (K)=(Constant) Tg of gellant (K); wherein the Constant is less than 1.5; depositing the curable ink in one or more layers; and curing the deposited ink to form the three-dimensional object.

Three-dimensional (3D) printers are becoming increasingly popular in home and professional applications. There are many advantages to using 3D printers, including quicker, more economical and high throughput prototype evaluation. 3D printers currently offer a number of solutions for selective deposition modeling for professional use.

A typical printing system applies an ultra-violet (UV) curable hot melt material to a non-curable wax support via inkjet. Each layer, typically microns in size, is cured after deposition. When the fabrication is complete, the support material is washed, melted or blasted away, depending on its composition, leaving the 3D fabrication. The UV curable materials are available in a wide variety of physical characteristics (e.g., tensile strength, tensile modulus, flexural strength, and the like), but in a limited number of colors, and using different colors presents a particular challenge due to differing rates of curing and final curing hardness value which may preclude printing articles with multiple colors. Many of the current materials are available in a limited number of colors, and many of the materials are not transparent and are often slightly yellow in color even in the absence of colorants.

Further, additive manufacturing as practiced in industry has been, to date, mostly concerned with printing structural features using conventional curable ultra-violet (UV) inks when a multi-jet modeling (MJM) process is used. In MJM process, liquid monomer is jetted onto a substrate layer by layer, interspersed with a curing step by UV light to build up a three-dimensional object over time. Objects that have overhangs require a support layer that is jettable, curable, and removable after the object has been formed. This approach is used, for example, to print clear, glass-like, transparent, and/or colored objects. However, these objects often are yellowing with time or are not completely clear. Early attempts at making objects from UV gel inks has in some cases produced opaque samples and/or objects that are yellow or that have yellowed with time.

U.S. patent application Ser. No. 14/630,629, which is hereby incorporated by reference herein in its entirety, describes in the Abstract thereof a color three-dimensional (3D) printing system including (1) a solid build ink for each of a plurality of colors, wherein each solid build ink includes (a) a solid acrylate in an amount from about 40 to about 70 percent by weight, (b) a non-curable wax in an amount from about 10 to about 45 percent by weight, (c) a curable wax in an amount from about 1 to about 15 percent by weight, (d) a photoinitiator, and (e) a colorant; each solid build ink has a curing speed adjusted by a ratio of the non-curable wax to curable wax such that the initial curing speed and final hardness of each solid build ink is approximately the same for each of the plurality of colors, and (2) a support material including the non-curable wax used in each build ink, the support material providing a scaffold for deposition of each build ink.

U.S. Pat. No. 8,882,256, which is hereby incorporated by reference herein in its entirety, describes in the Abstract thereof curable solid inks which are solid at room temperature and molten at an elevated temperature at which the molten ink is applied to a substrate. In particular, the curable solid inks comprise low molecular weight amide gellants that impart self-leveling capabilities to the inks. Also disclosed are methods for making the amide gellant and the inks comprising the amide gellants.

U.S. Pat. No. 8,916,084, which is hereby incorporated by reference herein in its entirety, describes in the Abstract thereof a method for fabricating a three-dimensional object including depositing a first amount of an ultraviolet curable phase change ink composition comprising an optional colorant and a phase change ink vehicle comprising a radiation curable monomer or prepolymer; a photoinitiator; a reactive wax; and a gellant upon a print region surface; successively depositing additional amounts of the ultraviolet curable phase change ink composition to create a three-dimensional object; and curing the ultraviolet curable phase change ink composition.

Currently available ink compositions are suitable for their intended purposes. However, a need remains for improved ink compositions that are clear and that do not yellow upon curing. Further, a need remains for improved ink compositions suitable for three-dimensional printing of clear objects. Still further, a need remains for improved compositions suitable for three-dimensional printing of clear objects that do not yellow with age.

The appropriate components and process aspects of the each of the foregoing U.S. Patents and Patent Publications may be selected for the present disclosure in embodiments thereof. Further, throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

SUMMARY

Described is a curable ink comprising at least one monomer, oligomer, or prepolymer; an optional photoinitiator; an optional colorant; and an amide gellant having a molecular weight of from about 800 to about 2,500 g/mole; wherein the ink has an onset of gelation defined by the glass transition of the amide gellant according to the relationship Onset of Gelation (K)=(Constant) Tg of gellant (K); wherein the Constant is less than 1.5.

Also described is a process for printing a three-dimensional article comprising providing a curable ink comprising at least one monomer, oligomer, or prepolymer; an optional photoinitiator; an optional colorant; and an amide gellant having a molecular weight of from about 800 to about 2,500 g/mole; wherein the ink has an onset of gelation defined by the glass transition of the amide gellant according to the relationship Onset of Gelation (K)=(Constant) Tg of gellant (K); wherein the Constant is less than 1.5; depositing the curable ink in one or more layers; curing the deposited ink to form the three-dimensional object.

Also described is a curable ink comprising at least one monomer, oligomer, or prepolymer; a photoinitiator; an optional colorant; and an amide gellant having a molecular weight of from about 800 to about 2,500 g/mole; wherein the ink has an onset of gelation defined by the glass transition of the low molecular weight amide gellant according to the relationship Onset of Gelation (K)=(Constant) Tg of gellant (K); wherein the Constant is less than 1.5; and wherein the low molecular weight amide gellant exhibits a three stage gelation profile.

DETAILED DESCRIPTION

Figure 1:
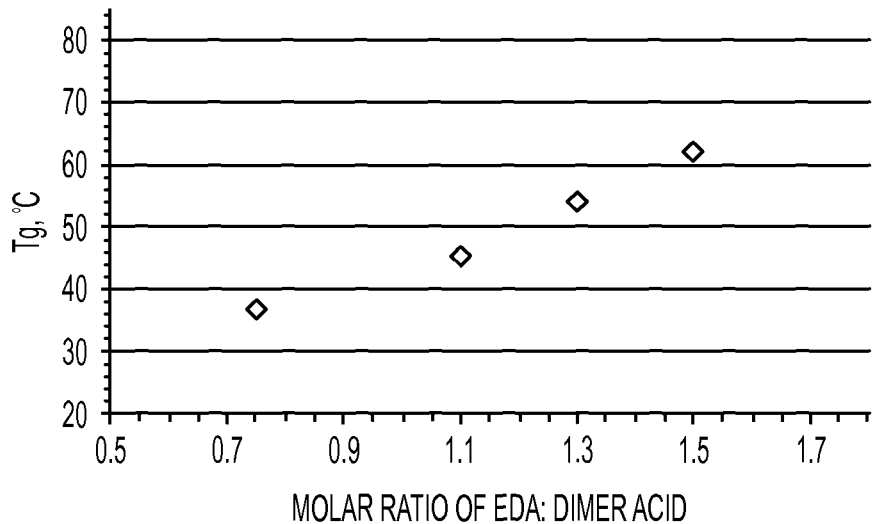
FIG. 1 is a graph showing the Tg (y-axis, ° C.) as a function of ethylene diamine (EDA) dimer acid molar stoichiometry (x-axis).

Embodiments herein provide for the use of a low molecular weight amide gelling agent, in embodiments, dimer acid:EDA (ethylene diamine), 2:<1.1, to produce radiation curable inks, in embodiments, ultra-violet (UV) curable gel inks, that cure to produce clear objects, equal or better to conventional curable UV inks if a similar photoinitiator package is used. Unexpectedly, it was also found that the formulations of the present embodiments have improved and predictable phase change transition properties, in embodiments, (onset of gelation (K)=Tg (K)*1.1), and are non-yellowing as compared to formulations containing higher molecular weight polymeric amide gelling agents of the same family, for example, dimer acid:EDA, 2:>1.1.

In particular embodiments, a new manufacturing process herein includes the use of a phase-change radiation curable ink enabled by adding a gellant to the ink that can form a clear object while at the same time having appropriate onset of gelation and non-yellowing properties. The present material is capable of forming free-standing films once the phase-change has taken place. In certain embodiments, gellants of low molecular weight are selected.

In embodiments, a curable ink herein comprises at least one monomer, oligomer, or prepolymer; a photoinitiator; an optional colorant; and an amide gellant having a molecular weight of from about 800 to about 2,500 g/mole; wherein the ink has an onset of gelation defined by the glass transition of the low molecular weight amide gellant according to the relationship Onset of Gelation (K)=(Constant) Tg of gellant (K);

wherein the Constant is less than 1.5. In embodiments, the Constant is 1.1. In embodiments, the ink is wax-free.

In embodiments, the ink cures to produce a clear object. In embodiments, the ink is non-yellowing. That is, the ink cures to produce a clear object that remains clear and does not yellow over time. In embodiments, the ink cures to produce a clear, colored object, wherein the color is not limited. For example, the color can be clear yellow, clear blue, clear cyan, clear magenta, etc. In other embodiments, clear means clear and colorless. In embodiments, as used herein, clear can mean transparent, without discoloration, of a pure, even color. In embodiments, clear means that the parts are translucent or transparent. For example, in embodiments, clear means that the parts are translucent when the parts are thick and transparent when the parts are thin. In embodiments, the clear inks herein have a transmission value of greater than 80 percent. In embodiments, the cured ink is a clear, colored ink, such as a clear yellow, although not limited to clear yellow. In other embodiments, the cured ink is a clear, colorless ink. In embodiments, inks that are cured clear show less yellowing over time than inks that are cured yellow. The cured inks can be clear and colored or clear and colorless. In embodiments, a thin part herein comprises a part that is up to about 1 centimeter in thickness. In embodiments, a thin part comprises a part that is from about 0.1 centimeter to about 1 centimeter thick. In embodiments, a thick part comprises a part that is greater than 1 centimeter thick. In embodiments, a thick part comprises a part that is from about greater than 1 centimeter to about 100 centimeters thick, or from about 2 centimeters to about 100 centimeters thick, or from about 3 centimeters to about 100 centimeters thick.

In embodiments, the inks herein containing the low molecular weight gellant are less yellow at time zero (right after curing), than inks containing standard or higher molecular weight gellants, which inks are inherently more yellow at time zero.

In embodiments, after curing and aging, the ink appears clear and substantially free of yellowish color. For example, after curing via UV light and aging for a period of 1 month, the ink herein possesses an appearance that is clear and substantially free of yellowing. In embodiments, under ambient conditions in an indoor environment, after curing, the ink herein is stable and non-yellowing for up to a year or more.

In embodiments, the ink herein comprises a wax-free ink; that is, the ink does not contain wax or is substantially free of wax. In embodiments, a curable ink herein comprises at least one monomer, oligomer, or prepolymer; an optional photoinitiator; an optional colorant; and an amide gellant having a molecular weight of from about 800 to about 2,500 g/mole; wherein the ink has an onset of gelation defined by the glass transition of the amide gellant according to the relationship Onset of Gelation (K)=(Constant) Tg of gellant (K); wherein the Constant is less than 1.5; and wherein the ink is wax-free. The presence of wax affects the onset temperature of ink gelation. In embodiments, the ink herein does not contain wax and so the onset ink gelation temperature is not affected by the presence of wax.

Any suitable or desired low molecular weight amide gellant can be selected for embodiments herein. In embodiments, the amide gellant is of the formula

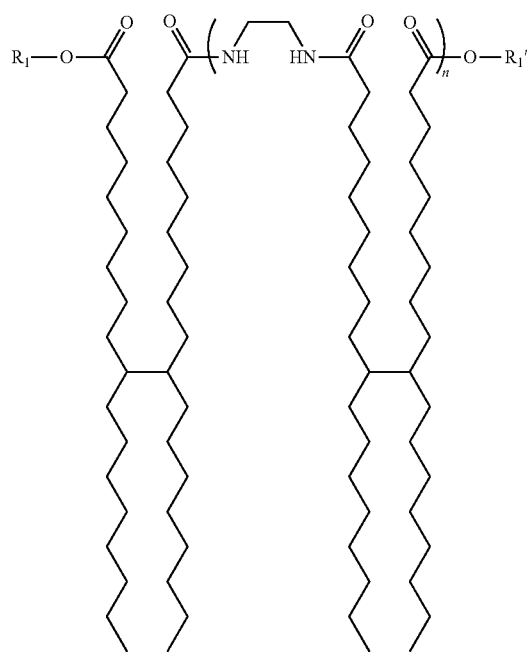

wherein n is 1 to 10; and wherein $R_1$ and $R_1'$ are each, independently of the other, selected from the group consisting of

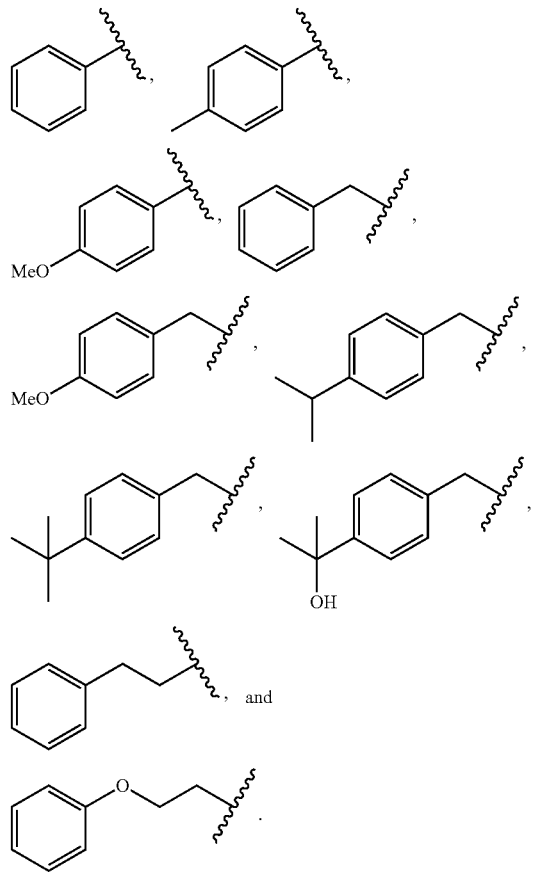

In certain embodiments, n is between 1 and 2.

In embodiments, the amide gellant has a molecular weight of less than about 2,000 g/mole.

In embodiments, the gellant and ink vehicle are selected so that the onset of gelation of the final ink is about 75° C. or lower, and in embodiments less than 70° C. Thus, in embodiments, the onset of gelation of the ink is about 75° C. or lower. In a specific embodiment, the onset of gelation of the ink is less than about 70° C.

, In embodiments, the glass transition temperature of the gellant material is less than about 40° C. In embodiments, the glass transition temperature of the gellant material is less than about 40° C. and the gellant satisfies the following relationship for properties at temperatures in Kelvin:

Onset of Gelation (K)=(Constant) Tg of gellant (K);

wherein the Constant is less than 1.5, and in embodiments, is equal to 1.1.

In one embodiment, the amide gellant is of the formula $C_{90}H_{160}N_2O_8$ having the molecular weight 1398.24, having the structure

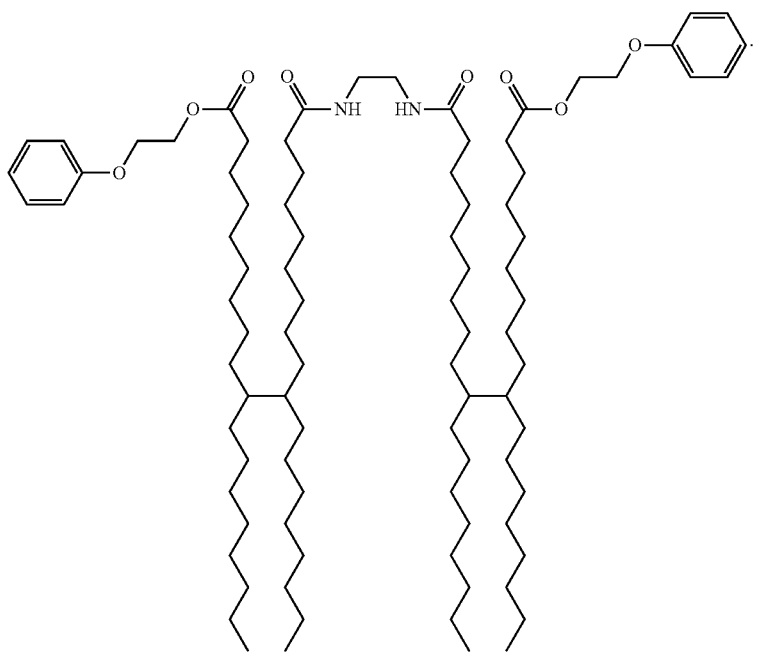 [SMILES: CCCCCCCCC(CCCCCCCCC(=O)NCCNC(=O)CCCCCCCCC(CCCCCCCC)C(CCCCCCCC)CCCCCCCCC(=O)OCCOc1ccccc1)C(CCCCCCCC)CCCCCCCCC(=O)OCCOc1ccccc1]

In one embodiment, the amide gellant is of the formula $C_{128}H_{234}N_4O_{10}$ having the molecular weight 1989.25, having the structure

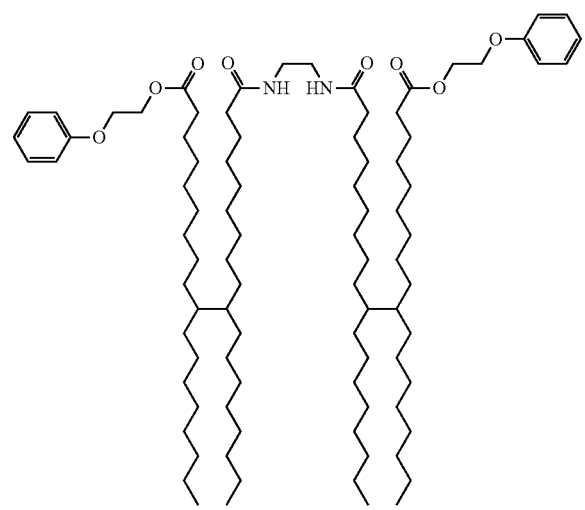

Chemical Formula: $C_{128}H_{234}N_4O_{10}$
Molecular Weight: 1989.25

In embodiments, the amide gellant has a weight average molecular weight (Mw) of from about 800 to about 2,500, g/mole or from about 900 to about 2,400 g/mole, or from about 1,000 to about 2,300 g/mole. In embodiments, the amide gellant has a number average molecular weight (Mn) of from about 500 to about 2,500, or from about 700 to about 2,300, or from about 900 to about 2000.

The low molecular weight amide gellant can be selected from those described in U.S. Pat. No. 8,882,256, which is hereby incorporated by reference herein in its entirety.

The amide gellant can be prepared using any suitable or desired process. In embodiments, the amide gellant is prepared using a two step process. In the first step, an amide gellant precursor (organoamide) is synthesized by using two equivalents of dimer acid, such as Pripol 1009 (available from Croda Inc., Edison, N.J.), and one equivalent of ethylenediamine (EDA), as shown in the reaction scheme

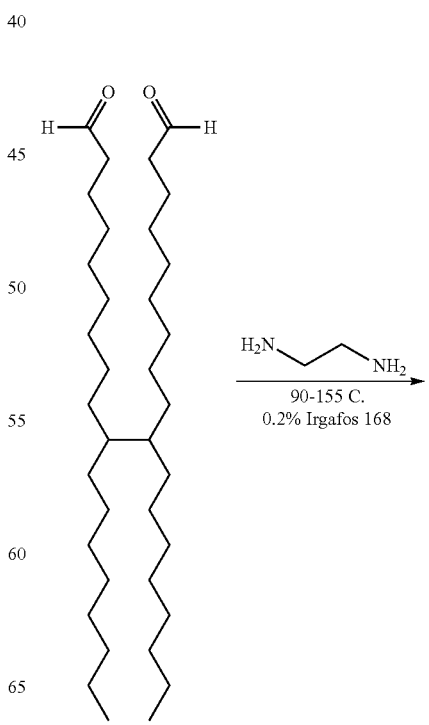

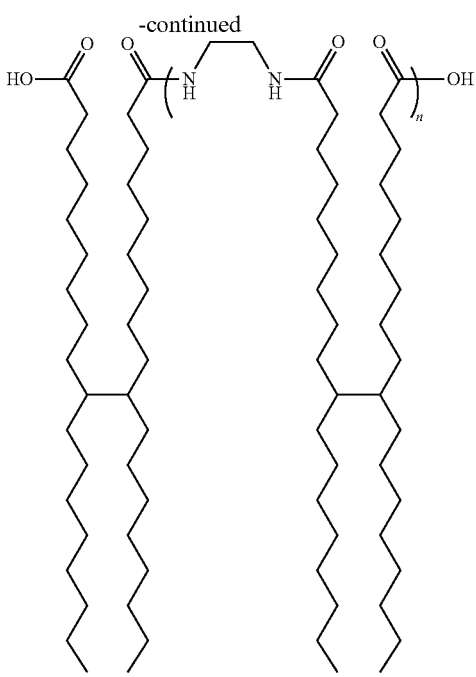

wherein n may be 0 to about 20, about 0 to about 15, or about 0 to about 10. In certain embodiments, n is about 1 to about 10.

In the second step, the organoamide is end-capped with various end cap alcohols to make the esters. During the preparation of the organoamide, oligomers (also referred to as x-mers) of the ester-terminated polyamide (ETPA) gellant are created (end-capping to make the esters in the final gellant does not change the oligomer distribution).

From the two-step process, there is achieved gellant compositions that comprise blend of oligomers or x-mers of an ester-terminated polyamide gellant. The blend oligomers or x-mers may include monomers or unimers, thus as used herein, the term "oligomer" or "x-mer" includes monomers or unimers in addition to molecules that consist of a plurality of monomers such as dimers, trimers, tetramers, pentamers, etc. The oligomeric amide gellant composition comprise discrete ranges of oligomers or x-mers that provide optimal gel point and room temperature viscosity to facilitate stable jetting and controlled showthrough of the printed inks.

Properties of amide gellants and inks herein are shown in Table 1.

TABLE 1

| Amide Gellant | Ink | Molar Ratio of EDA: Dimer Acid | Tg of Gellant, °C. | Onset of Gelation of Ink, °C.** | Onset of Gelation of Ink (K)/Tg of Gellant (K) |
|---|---|---|---|---|---|
| Example Gellant 2 | Example 2 | 0.75:2 | 37 | 64.8 | 1.09 |
| Example Gellant 1 | Comparative Example 3 | 1.1:2 | 45 | 74.5 | 1.09 |
| Example Gellant 3 | — | 1.3:2 | 54 | — | — |
| Example Gellant 4 | — | 1.5:2 | 62 | — | — |

** The onset of gelation relates to inks containing 7.5 weight percent gellant.

The glass transition temperature (Tg) of the gellants, made by reacting different molar ratios of ethylene diamine and dimer acid, showed near linear dependency on that molar ratio as shown in FIG. 1.

The ratio of the onset of gelation Temperature (K) to the glass transition Temperature (K) was found to be a constant with a value of 1.09. The predicted onset of gelation of the high Mw gellants are 87 and 96° C., respectively, therefore making them less suitable in ink-jet inks used for building objects. The ratio of EDA to dimer acid used in the synthesis of the gellant thus defines the target glass transition temperature (Tg) of the gellant and indirectly the onset of gelation of the ink incorporating that gellant.

In a specific embodiment, a curable ink herein comprises at least one monomer, oligomer, or prepolymer; an optional photoinitiator; an optional colorant; and a low molecular weight amide gellant having a molecular weight of from about 800 to about 2,500 g/mole; wherein the ink has an onset of gelation defined by the glass transition of the low molecular weight amide gellant according to the relationship Onset of Gelation (K)=(Constant) Tg of gellant (K);

wherein the Constant is less than 1.5; and wherein the low molecular weight amide gellant exhibits a three stage gelation profile. In embodiments, the Constant is about 1.1. In certain embodiments, the low molecular weight amide gellant has a molecular weight of less than about 2,000 g/mole. In certain embodiments, the onset of gelation of the ink is less than about 70° C. In certain embodiments, the glass transition temperature of the curable amide gellant is less than about 40° C.

In embodiments, the ink comprises at least one monomer, oligomer, or prepolymer. In specific embodiments, the ink disclosed herein can comprise any suitable curable monomer, oligomer, or prepolymer. Examples of suitable materials include radiation curable monomer compounds, such as acrylate and methacrylate monomer compounds, which are suitable for use as phase change ink carriers. Specific examples of relatively nonpolar acrylate and methacrylate monomers include (but are not limited to) isobornyl acrylate (available from Sartomer Co. Inc. as SR506A), 4-acryloylmorpholine (available from Aldrich Chemical Co.), isobornyl methacrylate, lauryl acrylate, lauryl methacrylate, isodecylacrylate, isodecylmethacrylate, caprolactone acrylate, 2-phenoxyethyl acrylate, isooctylacrylate, isooctylmethacrylate, butyl acrylate, and the like, as well as mixtures and combinations thereof. In addition, multifunctional acrylate and methacrylate monomers and oligomers can be included in the phase change ink carrier as reactive diluents and as materials that can increase the croslink density of the cured image, thereby enhancing the toughness of the cured images. Different monomer and oligomers can also be added to tune the plasticity or elasticity of the cured objects. Examples of suitable multifunctional acrylate and methacrylate monomers and oligomers include (but are not limited to) pentaerythritol tetraacrylate, pentaerythritol tetramethacrylate, 1,2-ethylene glycol diacrylate, 1,2-ethylene glycol dimethacrylate, 1,6-hexanediol diacrylate, 1,6-hexanediol dimethacrylate, 1,12-dodecanol diacrylate, 1,12-dodecanol dimethacrylate, tris(2-hydroxy ethyl) isocyanurate triacrylate, propoxylated neopentyl glycol diacrylate (available from Sartomer Co. Inc. as SR 9003), hexanediol diacrylate, tripropylene glycol diacrylate, dipropylene glycol diacrylate, amine modified polyether acrylates (available as PO 83 F, LR 8869, and/or LR 8889 (all available from BASF Corporation), trimethylolpropane triacrylate, glycerol propoxylate triacrylate, dipentaerythritol pentaacrylate, dipentaerythritol hexaacrylate, ethoxylated pentaerythritol tetraacrylate (available from Sartomer Co. Inc. as SR 494), and the like, as well as mixtures and combinations thereof. When a reactive diluent is added to the ink carrier material, the reactive diluent is added in any desired or effective amount, in one embodiment at least about 1 percent by weight of the carrier, and in another embodiment at least about 35 percent by weight of the carrier, and in one embodiment no more than about 80 percent by weight of the carrier, and in another embodiment no more than about 70 percent by weight of the carrier, although the amount of diluent can be outside of these ranges.

In embodiments, the ink vehicles contain at least one compound that can exhibit gel-like behavior in that it undergoes a relatively sharp increase in viscosity over a relatively narrow temperature range when dissolved in a liquid such as those compounds that behave as curable monomers when exposed to radiation such as ultraviolet light. One example of such a liquid curable monomer is 4-acrylolylmorpholine (ACMO), commercially available from Sigma-Aldrich.

In one embodiment, some compounds as disclosed herein undergo a change in viscosity of at least about $10^3$ centipoise, in another embodiment at least about $10^5$ centipoise, and in yet another embodiment at least about $10^6$ centipoise over a temperature range of in one embodiment at least about 30° C., in another embodiment at least about 10° C., and in yet another embodiment at least about 5° C., although the viscosity change and temperature range can be outside of these ranges, and compounds that do not undergo changes within these ranges are also included herein.

At least some embodiments of the compounds disclosed herein can form a semi-solid gel at a first temperature. For example, when the compound is incorporated into a phase change ink, this temperature is below the specific temperature at which the ink is jetted. The semi-solid gel phase is a physical gel that exists as a dynamic equilibrium comprising one or more solid gellant molecules and a liquid solvent. The semi-solid gel phase is a dynamic networked assembly of molecular components held together by non-covalent interactions such as hydrogen bonding, Van der Waals interactions, aromatic non-bonding interactions, ionic or coordination bonding, London dispersion forces, or the like, which, upon stimulation by physical forces, such as temperature, mechanical agitation, or the like, or chemical forces, such as pH, ionic strength, or the like, can undergo reversible transitions from liquid to semi-solid state at the macroscopic level. The solutions containing the gellant molecules exhibit a thermally reversible transition between the semi-solid gel state and the liquid state when the temperature is varied above or below the gel point of the solution. This reversible cycle of transitioning between semi-solid gel phase and liquid phase can be repeated many times in the solution formulation.

In specific embodiments, the ink vehicles disclosed herein can comprise any suitable photoinitiator. Examples of specific initiators include, but are not limited to, Irgacure® 127, Irgacure® 379, and Irgacure® 819, all commercially available from Ciba Specialty Chemicals, among others. Further examples of suitable initiators include (but are not limited to) benzophenones, benzyl ketones, monomeric hydroxyl ketones, polymeric hydroxyl ketones, α-alkoxy benzyl ketones, α-amino ketones, acyl phosphine oxides, metallocenes, benzoin ethers, benzil ketals, α-hydroxyalkylphenones, α-aminoalkylphenones, acylphosphine photoinitiators sold under the trade designations of IRGACURE and DAROCUR from Ciba, and the like. Specific examples include 1-hydroxy-cyclohexylphenylketone, benzophenone, 2-benzyl-2-(dimethylamino)-1-(4-(4-morphorlinyl)phenyl)-1-butanone, 2-methyl-1-(4-methylthio)phenyl-2-(4-morphorlinyl)-1-propanone, diphenyl-(2,4,6-trimethylbenzoyl) phosphine oxide, phenyl bis(2,4,6-trimethylbenzoyl) phosphine oxide, benzyl-dimethylketal, isopropylthioxanthone, 2,4,6-trimethylbenzoyldiphenylphosphine oxide (available as BASF LUCIRIN TPO), 2,4,6-trimethylbenzoylethoxyphenylphosphine oxide (available as BASF LUCIRIN TPO-L), bis(2,4,6-trimethylbenzoyl)-phenyl-phosphine oxide (available as Ciba IRGACURE 819) and other acyl phosphines, 2-methyl-1-(4-methylthio)phenyl-2-(4-morphorlinyl)-1-propanone (available as Ciba IRGACURE 907) and 1-(4-(2-hydroxyethoxy)phenyl)-2-hydroxy-2-methylpropan-1-one (available as Ciba IRGACURE 2959), 2-benzyl 2-dimethylamino 1-(4-morpholinophenyl) butanone-1 (available as Ciba IRGACURE 369), 2-hydroxy-1-(4-(4-(2-hydroxy-2-methylpropionyl)-benzyl)-phenyl)-2-methylpropan-1-one (available as Ciba IRGACURE 127), 2-dimethylamino-2-(4-methylbenzyl)-1-(4-morpholin-4-ylphenyl)-butanone (available as Ciba IRGACURE 379), titanocenes, isopropylthioxanthone, 1-hydroxy-cyclohexylphenylketone, benzophenone, 2,4,6-trimethylbenzophenone, 4-methylbenzophenone, diphenyl-(2,4,6-trimethylbenzoyl) phosphine oxide, 2,4,6-trimethylbenzoylphenylphosphinic acid ethyl ester, oligo(2-hydroxy-2-methyl-1-(4-(1-methylvinyl)phenyl) propanone), 2-hydroxy-2-methyl-1-phenyl-1-propanone, benzyl-dimethylketal, and the like, as well as mixtures thereof.

Optionally, the phase change inks can also contain an amine synergist, which are co-initiators which can donate a hydrogen atom to a photoinitiator and thereby form a radical species that initiates polymerization, and can also consume dissolved oxygen, which inhibits free-radical polymerization, thereby increasing the speed of polymerization. Examples of suitable amine synergists include (but are not limited to) ethyl-4-dimethylaminobenzoate, 2-ethylhexyl-4-dimethylaminobenzoate, and the like, as well as mixtures thereof.

Initiators for inks disclosed herein can absorb radiation at any desired or effective wavelength, in one embodiment at least about 200 nanometers, and in one embodiment no more than about 560 nanometers, and in another embodiment no more than about 420 nanometers, although the wavelength can be outside of these ranges.

Optionally, the photoinitiator is present in the phase change ink in any desired or effective amount, in one embodiment at least about 0.5 percent by weight of the ink composition, and in another embodiment at least about 1 percent by weight of the ink composition, and in one embodiment no more than about 15 percent by weight of the ink composition, and in another embodiment no more than about 10 percent by weight of the ink composition, although the amount can be outside of these ranges.

In specific embodiments, the inks herein are clear. Thus, in embodiments, the inks do not contain a colorant. In other embodiments, the inks contain a colorant to provide a translucent (clear/colored/see-through) product. In embodiments, clear and/or translucent inks herein are obtained by limiting the amount of photoinitiator, in embodiments by limiting the amount of phosphine oxide photoinitiator. In embodiments, the inks contain less than 2 weight percent photoinitiator, in embodiments, less than 2 weight percent phosphine oxide photoinitiator, based on the total weight of the ink.

Optionally, the inks herein can contain a colorant. The optional colorant, if present, may be present in any desired amount, for example from about 0.5 to about 75% by weight of the ink, for example from about 1 to about 50% or from about 1 to about 25%, by weight of the ink. In certain embodiments, nicely colored printed parts can be obtained with very dilute colorant loadings. In embodiments, thick parts as defined herein can be prepared, and cured, to provide nicely colored printed parts with very dilute colorant loadings. In embodiments, the colorant can be present in an amount of from about 0.005 to about 75% by weight of the ink, for example from about 0.01 to about 50% or from about 0.1 to about 25%, by weight of the ink. In embodiments, the colorant can be present in an amount of from about 0.005 to 0.1%, or from about 0.005 to less than about 25%, by weight of the ink.

Any suitable colorant can be used in embodiments herein, including dyes, pigments, or combinations thereof. As colorants, examples may include any dye or pigment capable of being dispersed or dissolved in the vehicle.

In a specific embodiment, the ink herein is used to create a three-dimensional object, wherein the three-dimensional object is clear.

The ink herein can also optionally contain an antioxidant. The optional antioxidants can protect the images from oxidation and can also protect the ink components from oxidation during the heating portion of the ink preparation process. Specific examples of suitable antioxidant stabilizers include (but are not limited to) NAUGARD® 524, NAUGARD® 635, NAUGARD® A, NAUGARD® I-403, and NAUGARD® 959, commercially available from Crompton Corporation, Middlebury, Conn.; IRGANOX® 1010 and IRGASTAB® UV 10, commercially available from Ciba Specialty Chemicals; GENORAD 16 and GENO-RAD 40 commercially available from Rahn AG, Zurich, Switzerland, and the like, as well as mixtures thereof. When present, the optional antioxidant is present in the ink in any desired or effective amount, in one embodiment at least about 0.01 percent by weight of the ink carrier, in another embodiment at least about 0.1 percent by weight of the ink carrier, and in yet another embodiment at least about 1 percent by weight of the ink carrier, and in one embodiment no more than about 20 percent by weight of the ink carrier, in another embodiment no more than about 5 percent by weight of the ink carrier, and in yet another embodiment no more than about 3 percent by weight of the ink carrier, although the amount can be outside of these ranges.

The radiation curable phase change inks can also, if desired, contain additives to take advantage of the known functionality associated with such additives. Such additives may include, for example, defoamers, slip and leveling agents, pigment dispersants, surfactants, and the like, as well as mixtures thereof. The inks can also include additional monomeric or polymeric materials as desired.

In embodiments, the curable inks herein are radiation curable. The term "radiation curable" is intended to cover all forms of curing upon exposure to a radiation source, including light and heat sources and including in the presence or absence of initiators. Radiation curing routes include, but are not limited to, curing using ultraviolet (UV) light, for example having a wavelength of about 200 to about 400 nanometers or more rarely visible light, such as in the presence of photoinitiators and/or sensitizers, curing using e-beam radiation, such as in the absence of photoinitiators, curing using thermal curing, in the presence or absence of high temperature thermal initiators (and which are generally largely inactive at the jetting temperature), and appropriate combinations thereof. In specific embodiments, curing herein comprises thermal curing or ultra-violet curing.

In embodiments, curing of the ink can be effected by exposure of the ink image to actinic radiation at any desired or effective wavelength, in one embodiment at least about 200 nanometers, and one embodiment no more than about 480 nanometers, although the wavelength can be outside of these ranges. Exposure to actinic radiation can be for any desired or effective period of time, in one embodiment for at least about 0.2 second, in another embodiment for at least about 1 second, and in yet another embodiment for at least about 5 seconds, and in one embodiment for no more than about 30 seconds, and in another embodiment for no more than about 15 seconds, although the exposure period can be outside of these ranges. By curing is meant that the curable compounds in the ink undergo an increase in molecular weight upon exposure to actinic radiation, such as (but not limited to) crosslinking, chain lengthening, or the like.

The ink compositions generally have melt viscosities at the jetting temperature (in one embodiment no lower than about 50° C., in another embodiment no lower than about 60° C., and in yet another embodiment no lower than about 70° C., and in one embodiment no higher than about 120° C., and in another embodiment no higher than about 110° C., although the jetting temperature can be outside of these ranges) in one embodiment of no more than about 30 centipoise, in another embodiment of no more than about 20 centipoise, and in yet another embodiment of no more than about 15 centipoise, and in one embodiment of no less than about 2 centipoise, in another embodiment of no less than about 5 centipoise, and in yet another embodiment of no less than about 7 centipoise, although the melt viscosity can be outside of these ranges.

In one specific embodiment, the inks are jetted at low temperatures, in particular at temperatures below about 110° C., in one embodiment from about 40° C. to about 110° C., in another embodiment from about 50° C. to about 110° C., and in yet another embodiment from about 60° C. to about 90° C., although the jetting temperature can be outside of these ranges. At such low jetting temperatures, the conventional use of temperature differential between the jetted ink and the substrate upon which the ink is jetted to effect a rapid phase change in the ink (i.e., from liquid to solid) may not be effective. The gellant can thus be used to effect a rapid viscosity increase in the jetted ink upon the substrate. In particular, jetted ink droplets can be pinned into position on a receiving substrate such as a final recording substrate, such as paper or transparency material, or an intermediate transfer member, such as a transfuse drum or belt, that is maintained at a temperature cooler than the ink jetting temperature of the ink through the action of a phase change transition in which the ink undergoes a significant viscosity change from a liquid state to a gel state (or semi-solid state).

In some embodiments, the temperature at which the ink forms the gel state is any temperature below the jetting temperature of the ink, in one embodiment any temperature that is about 5° C. or more below the jetting temperature of the ink. In one embodiment, the gel state can be formed at a temperature of at least about 25° C., and in another embodiment at a temperature of at least about 30° C., and in one embodiment of no more than about 100° C., in another embodiment of no more than about 70° C., and in yet another embodiment of no more than about 50° C., although the temperature can be outside of these ranges. A rapid and large increase in ink viscosity occurs upon cooling from the jetting temperature, at which the ink is in a liquid state, to the gel temperature, at which the ink is in the gel state. The viscosity increase is in one specific embodiment at least a $10^{2.5}$-fold increase in viscosity.

In embodiments, a process for printing a three-dimensional article comprises providing a curable ink comprising at least one monomer, oligomer, or prepolymer; an optional photoinitiator; an optional colorant; and an amide gellant having a molecular weight of from about 800 to about 2,500 g/mole; wherein the ink has an onset of gelation defined by the glass transition of the low molecular weight amide gellant according to the relationship Onset of Gelation (K)=(Constant) Tg of gellant (K); wherein the Constant is less than 1.5; depositing the curable ink in one or more layers; and curing the deposited ink to form the three-dimensional object.

In certain embodiments, curing herein comprises curing after the last of the one or more layers is deposited.

In embodiments, the process herein comprises depositing successive layers of the curable ink to form an object having a selected height and shape. The successive layers of the curable ink can be deposited to a build platform or to a previous layer of solidified material in order to build up a three-dimensional object in a layerwise fashion. In embodiments herein, objects of virtually any design can be created, from a micro-sized scale to a macro-sized scale and can include simple objects to objects having complex geometries. The ink jet materials and method herein further advantageously provide a non-contact, additive process (as opposed to subtractive process such as computer numerical control machining) providing the built-in ability to deliver metered amounts of the present ink materials to a precise location in time and space.

The methods herein, can be employed with any desired printing system including systems suitable for preparing three-dimensional objects, such as a solid object printer, thermal ink jet printer (both with inks liquid at room temperature and with phase change inks), piezoelectric ink jet printer (both with inks liquid at room temperature and with phase change inks), acoustic ink jet printer (both with inks liquid at room temperature and with phase change inks), thermal transfer printer, gravure printer, electrostatographic printing methods (both those employing dry marking materials and those employing liquid marking materials), and the like. In alternate embodiments, the ink materials can be used for manual preparation of three-dimensional objects, such as through the use of molds or by manual deposition of the ink material, to prepare a desired three-dimensional object.

In a specific embodiment, the process herein includes depositing the ink using ink jet printing.

The present disclosure encompasses fabrication of objects ranging from extremely small objects to extremely large objects. For example, objects of from about 1 micrometer to about to about 10,000 micrometers in height or longest dimension can be prepared, although the height is not limited to these ranges. An appropriate number of passes or ink jettings may be selected so that object can be built up to a desired total print height and a desired shape.

In three-dimensional printing, the printhead or target stage is movable in three dimensions, x, y, and z, enabling the build up of an object of any desired size. There are no limits to the height or overall size of an object that can be created; however, very large objects may require intermediate curing in the deposition process. In building up an image, for example by way of multiple passes of the print head over the portions of the image to include raised images, by depositing successive layers of ink so that the object, or a section of the object has a desired print height and geometry.

The ink jet head may support single color or full color printing. In full color printing, the ink jet head typically includes different channels for printing the different colors. The ink jet head may include four different sets of channels, for example one for each of cyan, magenta, yellow and black. In such embodiments, the print head is capable of printing either full color regular height prints when the ink jet head is set at a minimum distance from the print region surface, or raised height prints of any color when the ink jet head is at a distance greater than the minimum distance from the print region surface.

For example, the three dimensional objects can be formed with appropriate multiple passing of the ink jet print head over an area to achieve the desired object height and geometry. Jetting of ink from multiple different ink jets of the ink jet head toward a same location of the image during a single pass may also be used to form raised height objects. As discussed above, in embodiments, each layer of ink may add from about 4 μm to about 15 μm in height to the image height. Knowing the total print height desired the appropriate number of passes or jettings may be readily determined.

A controller may then control the ink jet print head to deposit the appropriate amount and/or layers of ink at locations of the image so as to obtain the image with the desired print heights and overall geometries therein.

The three-dimensional objects prepared herein can be free standing parts or objects, rapid prototyping devices, raised structures on substrates, such as, for example, topographical maps, or other desired objects. Any suitable substrate, recording sheet, or removable support, stage, platform, and the like, can be employed for depositing the three-dimensional objects thereon, including plain papers such as XEROX® 4024 papers, XEROX® Image Series papers, Courtland 4024 DP paper, ruled notebook paper, bond paper, silica coated papers such as Sharp Company silica coated paper, JuJo paper, HAMMERMILL LASERPRINT® paper, and the like, glossy coated papers such as XEROX® Digital Color Gloss, Sappi Warren Papers LUSTROGLOSS®, and the like, transparency materials, fabrics, textile products, plastics, polymeric films, inorganic substrates such as metals and wood, as well as meltable or dissolvable substrates, such as waxes or salts, in the case of removable supports for free standing objects, and the like.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

A number of radiation curable non-gel inks and radiation curable gel inks containing relatively high and low Mw gelling agents were formulated to demonstrate the feasibility of the invention (no curable wax used). Eight specific examples are shown below in Table 2 and Table 3:

TABLE 2

| Component | Chemical | Comparative Example 1 | Example 2 | Comparative Example 3 | Comparative Example 4 |
|---|---|---|---|---|---|
| Monomers | Sartomer SR-9003 | 93 | 85.5 | 85.5 | 82.8 |
|  | Sartomer SR399LV | 5 | 5 | 5 | 5 |
| Gellants | Example Gellant 1 | — | — | 7.5 | 7.5 |
|  | Example Gellant 2 | — | 7.5 | — | — |
| PhotoInitiators | IRGACURE ® 819 | 1 | 1 | 1 | 1 |
|  | IRGACURE ® TPO-L | — | — | — | — |
|  | IRGACURE ® 184 | — | — | — | — |
|  | ESACURE ® KIP 150 | — | — | — | 3.5 |
| Radical Scavenger | BASF UV-10 | — | — | — | 0.2 |
| Stabilizers | Sartomer CN3216 | 1 | 1 | 1 | — |
|  | Total | 100 | 100 | 100 | 100 |

TABLE 3

| Component | Chemical | Comparative Example 5 | Example 6 | Comparative Example 7 | Comparative Example 8 |
|---|---|---|---|---|---|
| Monomers | Sartomer SR-9003 | 83.3 | 84 | 82.8 | 86.8 |
|  | Sartomer SR399LV | 5 | 5 | 5 | 5 |
| Gellants | Example Gellant 1 | 7.5 | — | 7.5 | 7.5 |
|  | Example Gellant 2 | — | 7.5 | — | — |
| PhotoInitiators | IRGACURE ® 819 | — | — | 1 | 0.5 |
|  | IRGACURE ® TPO-L | 1 | 1.5 | — | — |
|  | IRGACURE ® 184 | — | 2 | — | — |
|  | ESACURE ® KIP 150 | 3 | — | 3.5 | — |
| Radical Scavenger | BASF UV-10 | 0.2 | — | 0.2 | 0.2 |
| Stabilizers | Sartomer CN3216 | — | — | — | — |
|  | Total | 100 | 100 | 100 | 100 |

Inks of the present embodiments were exposed to a Phoseon UV LED lamp (8 W, 395 nm center-peak irradiance) until fully cured to form solid "dog bone" shaped objects about 3 millimeters thick to clearly demonstrate the advantages of the present invention.

A comparison of inks made with different gellants against the control without gellant demonstrated that the Example 2 ink, incorporating the lower molecular weight Example Gellant 2, realized the same low yellowness and transparency of the Comparative Example 1 ink containing no gellant.

A much-improved transparency was achieved with Example 6 ink, incorporating the lower molecular weight Example Gellant 2, over Comparative Example 4 and 5 inks made with higher molecular weight Example Gellant 1.

Ink Rheology Data and Visual Observation of UV Gel Ink Samples.

The rheological properties of the UV gel inks of the present invention were also obtained on an Ares G2 rheometer (TA Instruments) as per following measurement protocol:

Measurement protocol:
Temperature sweeps performed between 102 and 25° C.
50 mm cone and plate, 0.0486 mm, 2° radian
1.5° C./min
12 s sampling time
Iterative Strain Rate Application The rheological properties of the following typical formulations that contained various Mw versions of diamide gellant in SR-9003-based preparations were obtained for some ink preparations. Visually, it was observed that the standard high Mw gellant formed opaque gel inks while the low Mw formed clearer gel inks, the observations being made at room temperature.

Figure 2:
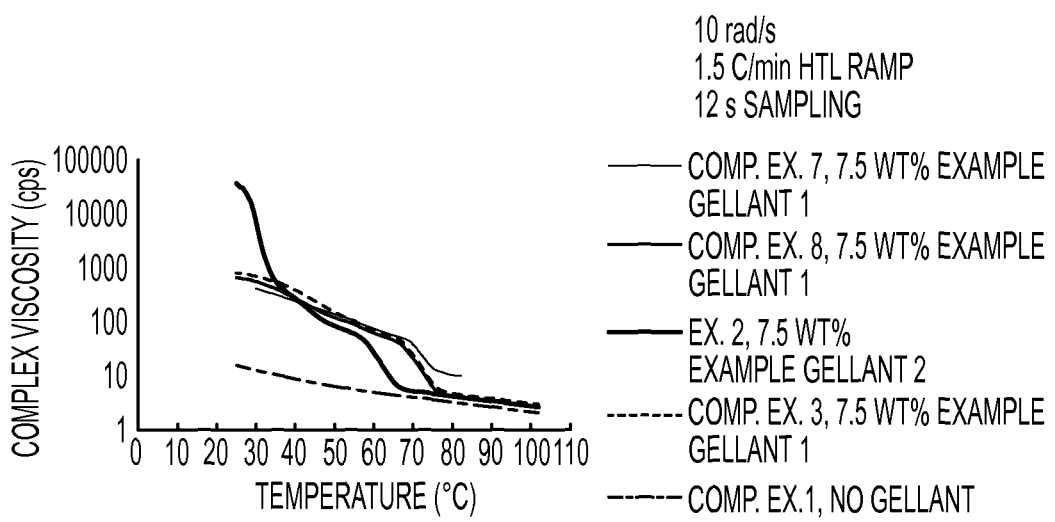
FIG. 2 is a graph showing complex viscosity (y-axis, cps) versus Temperature (x-axis, ° C.) of selected inks.

The inks included in the comparisons shown in FIG. 2 were from Comparative Examples 1, 3, 7, and 8 and Example 2.

It was observed that the low molecular weight gellant has a lower gel onset temperature and increased gel strength (50× factor) also showing a 3-stage gelation profile with LMw Example Gellant 2 shown in FIG. 2. It is believed that this characteristic may provide significant advantage in building object (work ongoing).

Figure 3:
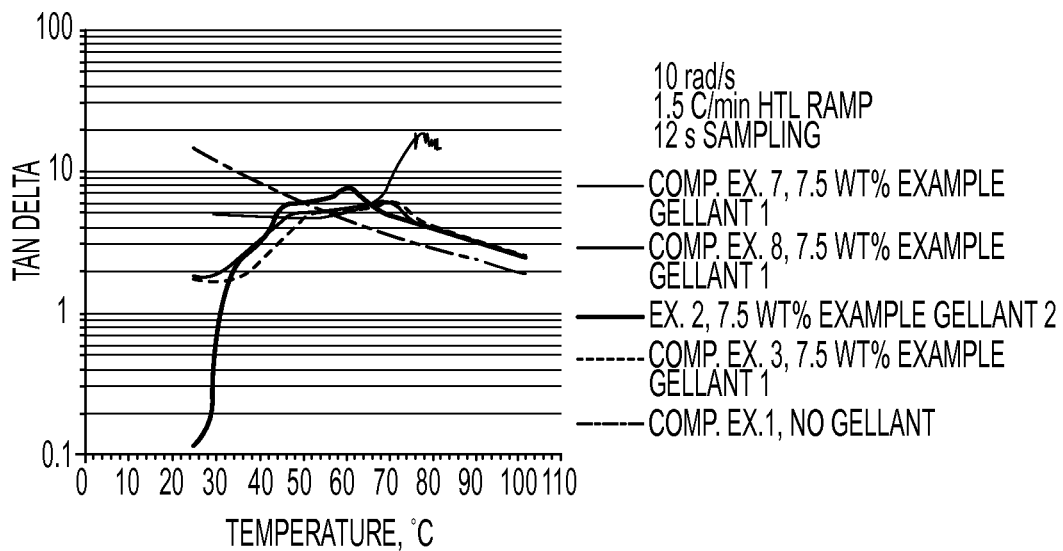
FIG. 3 is a graph showing Tan Delta (y-axis) versus Temperature (x-axis, ° C.) of selected inks.

FIG. 3 further highlights the advantages of the LMW Example Gellant 2 indicating a much stiffer pre-cured gel network that is formed as temperatures approach approximately 30° C. and lower.

Predictability of Structural Changes Over Temperature.

Figure 4:
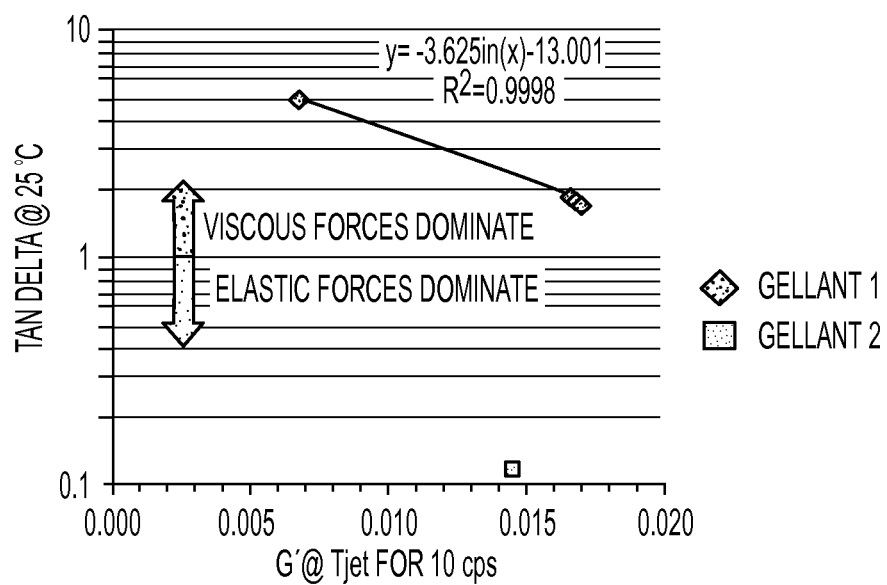
FIG. 4 is a graph showing Tan Delta at 25° C. (y-axis) versus G' at jetting temperature for 10 cps of comparative inks and inks according to the present embodiments.

FIG. 4 illustrates the elasticity characteristic of "jettable" preparations (containing Example Gellant 1 having relatively higher Mw) at a normalized viscosity to 10 mPa·s can predict the cross-over modulus at 25° C. (logarithmic relation). The G' of the ink preparation containing Example Gellant 2 (having relatively lower Mw) in the melted/dissolved phase of the ink is lower than the G' of preparations based on Example Gellant 1 yet has a much lower tan delta (a much stiffer gel). This indicates that the LMw gellant analog (Example Gellant 2) to be a superior gellant for SR-9003/SR-399LV system and other monomer/oligomer systems in accordance with the present embodiments.

Thus, advanced inkjet ink compositions for Digital Manufacturing of Transparent Object were formulated with success and their advantages demonstrated, including but not limited to:

Improved clear and transparent object can be built with UV gel inks with selection of:

Appropriate chemistry for the gelling agent;

Use of a low molecular weight gelling agent (Mn<2000 g/mole) that have superior gelling properties and provide ink design latitude as well as printing performance improvement (ongoing activity);

Formulations of the present invention have targeted onset of gelation that are defined by the glass transition of the gelling agent as per following relationship:

Onset of Gelation (K)=(Constant)×Tg (K), wherein the Constant is less than 1.5 or equal to 1.1.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. A curable ink comprising:
   at least one monomer, oligomer, or prepolymer;
   an optional photoinitiator;
   an optional colorant; and
   an amide gellant having a molecular weight of from about 800 to about 2,500 g/mole;
   wherein the ink has an onset of gelation defined by the glass transition of the low molecular weight amide gellant according to the relationship Onset of Gelation (K)=(Constant) Tg of gellant (K);

wherein the Constant is less than 1.5;
   wherein the ink cures to produce a clear object; and
   wherein the ink is wax-free.

2. The ink of claim 1, wherein after curing via UV light and aging for a period of 1 month, the object possesses an appearance that is clear and substantially free of yellowing.

3. The ink of claim 1, wherein the Constant is about 1.1.

4. The ink of claim 1, wherein, under ambient conditions in an indoor environment, after curing, the object is stable and non-yellowing for up to a year or more.

5. The ink of claim 1, wherein the amide gellant is of the formula

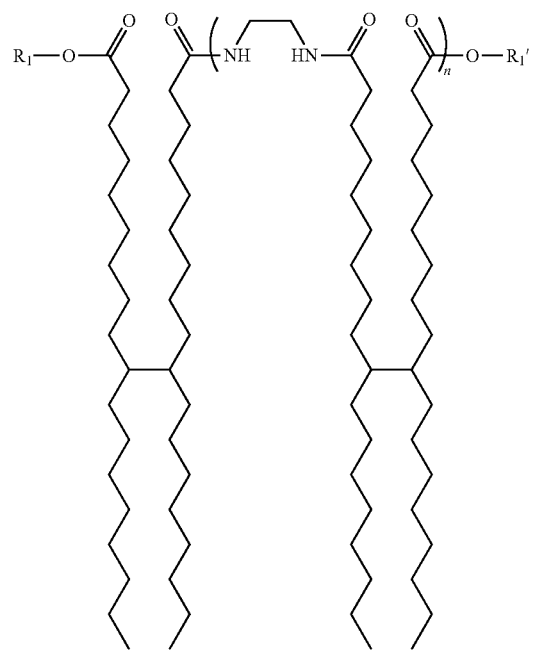

wherein n is 1 to 10; and
wherein $R_1$ and $R_1'$ are each, independently of the other, selected from the group consisting of

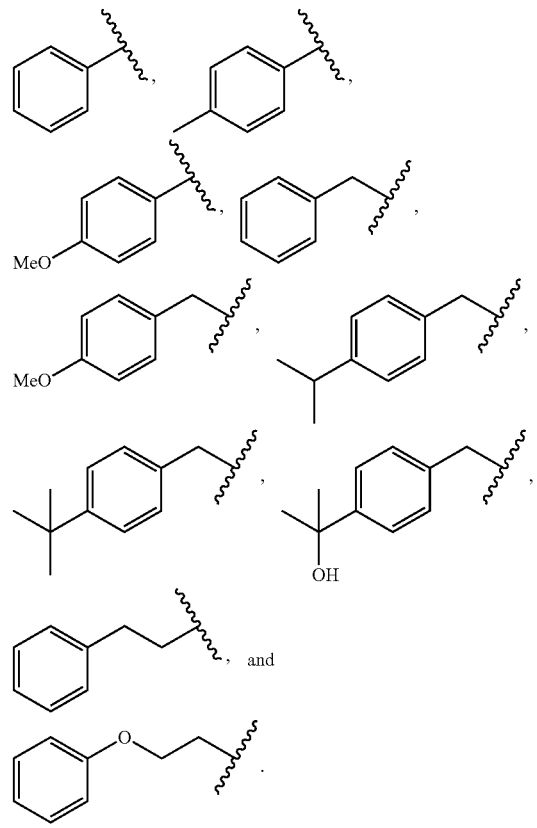

6. The ink of claim 5, wherein n is 1 to 2.

7. The ink of claim 1, wherein the amide gellant has a molecular weight of less than about 2,000 g/mole.

8. The ink of claim 1, wherein the onset of gelation of the ink is about 75° C. or lower.

9. The ink of claim 1, wherein the onset of gelation of the ink is less than about 70° C.

10. The ink of claim 1, wherein the glass transition temperature of the amide gellant is less than about 40° C.

11. A process for printing a three-dimensional article comprising:
providing a curable ink comprising at least one monomer, oligomer, or prepolymer; an optional photoinitiator; an optional colorant; and a low molecular weight amide gellant having a molecular weight of from about 800 to about 2,500 g/mole; wherein the ink has an onset of gelation defined by the glass transition of the low molecular weight amide gellant according to the relationship Onset of Gelation (K)=(Constant) Tg of gellant (K); wherein the Constant is less than 1.5; and wherein the ink is wax-free;
depositing the curable ink in one or more layers; and
curing the deposited ink to form the three-dimensional object, wherein the cured three-dimensional object is clear.

12. The process of claim 11, wherein depositing comprises ink jet printing.

13. The process of claim 11, wherein curing comprises curing after the last of the one or more layers is deposited.

14. The process of claim 11, wherein the three-dimensional object is clear.

15. The process of claim 11, wherein the amide gellant is of the formula

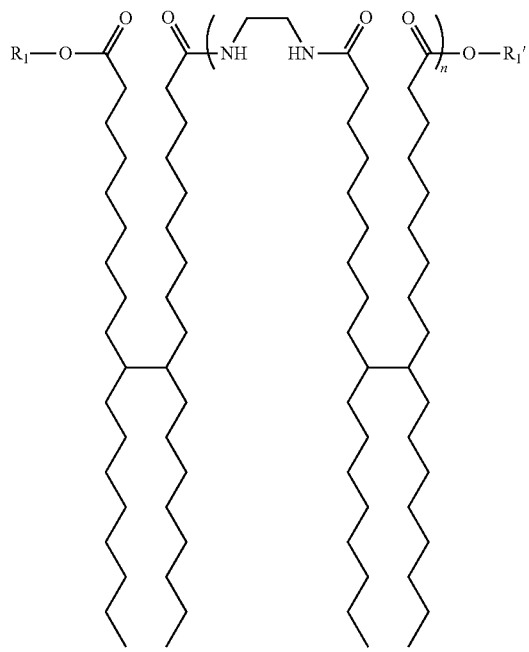

wherein n is 1 to 10; and
wherein $R_1$ and $R_1'$ are each, independently of the other, selected from the group consisting of

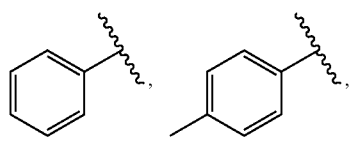

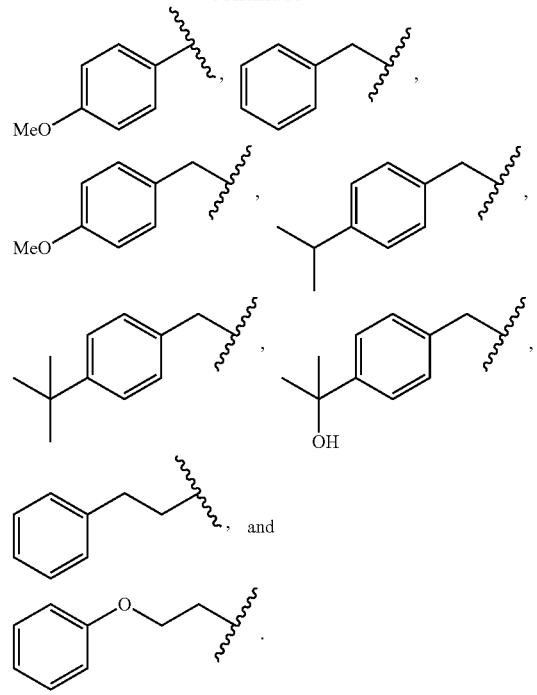

16. A curable ink comprising:
at least one monomer, oligomer, or prepolymer;
an optional photoinitiator;
an optional colorant; and
a low molecular weight amide gellant having a molecular weight of from about 800 to about 2,500 g/mole;
wherein the ink has an onset of gelation defined by the glass transition of the low molecular weight amide gellant according to the relationship Onset of Gelation (K)=(Constant) Tg of gellant (K);

wherein the Constant is less than 1.5;
wherein the low molecular weight amide gellant exhibits a three stage gelation profile;
wherein the ink cures to produce a clear object; and
wherein the ink is wax-free.

17. The ink of claim 16, wherein the amide gellant has a molecular weight of less than about 2,000 g/mole.

18. The ink of claim 16, wherein the onset of gelation of the ink is less than about 70° C.

19. The ink of claim 16, wherein the glass transition temperature of the curable amide gellant is less than about 40° C.

20. The process of claim 11, wherein the low molecular weight amide gellant exhibits a three stage gelation profile.

21. The ink of claim 1, wherein the ink cures to produce a clear, colored object;
wherein the ink contains colorant in an amount of from about 0.005 to 0.1 percent by weight, based on the weight of the ink; and
wherein the ink contains less than 2 percent by weight photoinitiator, based on the weight of the ink.

22. The process of claim 11, wherein the ink cures to produce a clear, colored object;
wherein the ink contains colorant in an amount of from about 0.005 to 0.1 percent by weight, based on the weight of the ink; and wherein the ink contains less than 2 percent by weight photoinitiator, based on the weight of the ink.

* * * * *